United States Patent
Killian

(10) Patent No.: US 8,401,972 B2
(45) Date of Patent: Mar. 19, 2013

(54) SYSTEM AND METHOD OF GENERATING A PER SALE WATERMARKING ON DIGITAL FILES

(75) Inventor: Thomas Killian, Westfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1078 days.

(21) Appl. No.: 11/553,639

(22) Filed: Oct. 27, 2006

(65) Prior Publication Data

US 2008/0104405 A1    May 1, 2008

(51) Int. Cl.
*H04L 9/00* (2006.01)
*G06Q 50/00* (2012.01)

(52) U.S. Cl. .......................... 705/51; 704/500

(58) Field of Classification Search .............. 705/50–51, 705/59; 704/500
See application file for complete search history.

(56) References Cited

U.S. PATENT DOCUMENTS

| | | | | |
|---|---|---|---|---|
| 5,940,135 | A * | 8/1999 | Petrovic et al. | 348/473 |
| 5,945,932 | A * | 8/1999 | Smith et al. | 341/51 |
| 6,219,634 | B1 * | 4/2001 | Levine | 704/200.1 |
| 6,430,301 | B1 | 8/2002 | Petrovic | |
| 6,614,914 | B1 * | 9/2003 | Rhoads et al. | 382/100 |
| 7,349,552 | B2 * | 3/2008 | Levy et al. | 382/100 |
| 7,460,667 | B2 * | 12/2008 | Lee et al. | 380/205 |
| 2003/0110126 | A1 | 6/2003 | Dunkeld et al. | |
| 2003/0167173 | A1 * | 9/2003 | Levy et al. | 704/273 |
| 2004/0247121 | A1 * | 12/2004 | Lee et al. | 380/205 |

FOREIGN PATENT DOCUMENTS

EP    1404129 A1 *    3/2004

OTHER PUBLICATIONS

Erküçük et al. ("A Robust Audio Watermark Representation Based on Linear Chirps", IEEE Transactions on Multimedia, vol. 8, No. 5, Oct. 2006, pp. 925-936).*
Bassia et al. ("Robust Audio Watermarking in the Time Domain", IEEE Transactions of Multimedia, vol. 3, No. 2, Jun. 2001, pp. 232-241).*
Liu et al. ("Scale Invariant Image Watermarking via Optimization Algorithms for Quantizing Randomized Statistics", MM&Sec '04, Sep. 20-21, 2004, Magdeburg, Germany, pp. 124-132).*
Wu et al. ("Robust and Efficient Digital Audio Watermarking Using Audio Content Analysis", IS&T/SPIE 12th International Symposium on Electronic Imaging, San Jose, CA, USA, Jan. 2000, 11 pages).*
Xu et al. ("Content-Based Digital Watermarking for Compressed Audio", Kent Ridge Digital Labs/Department of Computer Science, The University of Sydney, Feb. 22, 2000, 13 pages).*
Denise Caruso, "Technology, Digital Commerce", internet article, Aug. 7, 1995 <http://query.nytimes.com/gst/fullpage.html?res=990CE3D81431F934A3575BC0A963958260&sec=spon=&pagewanted=all>.
Theodore S. Papatheodorou et al., "European Conference of Minerva", internet article, Nov. 20-21, 2003<http://www.minervaeurope.org/events/parma/papers/ptcp.htm>.

* cited by examiner

*Primary Examiner* — James D Nigh

(57) ABSTRACT

A system, method and computer readable media provided for watermarking a digital file. The method comprises altering samples of the digital file available for distribution upon request by adding a number such as + or a −1 to each sample of the digital file according to a probability value and compressing the digital file with the altered samples. Altering the sample of the digital file may be done on a per distribution or per sale basis.

20 Claims, 2 Drawing Sheets

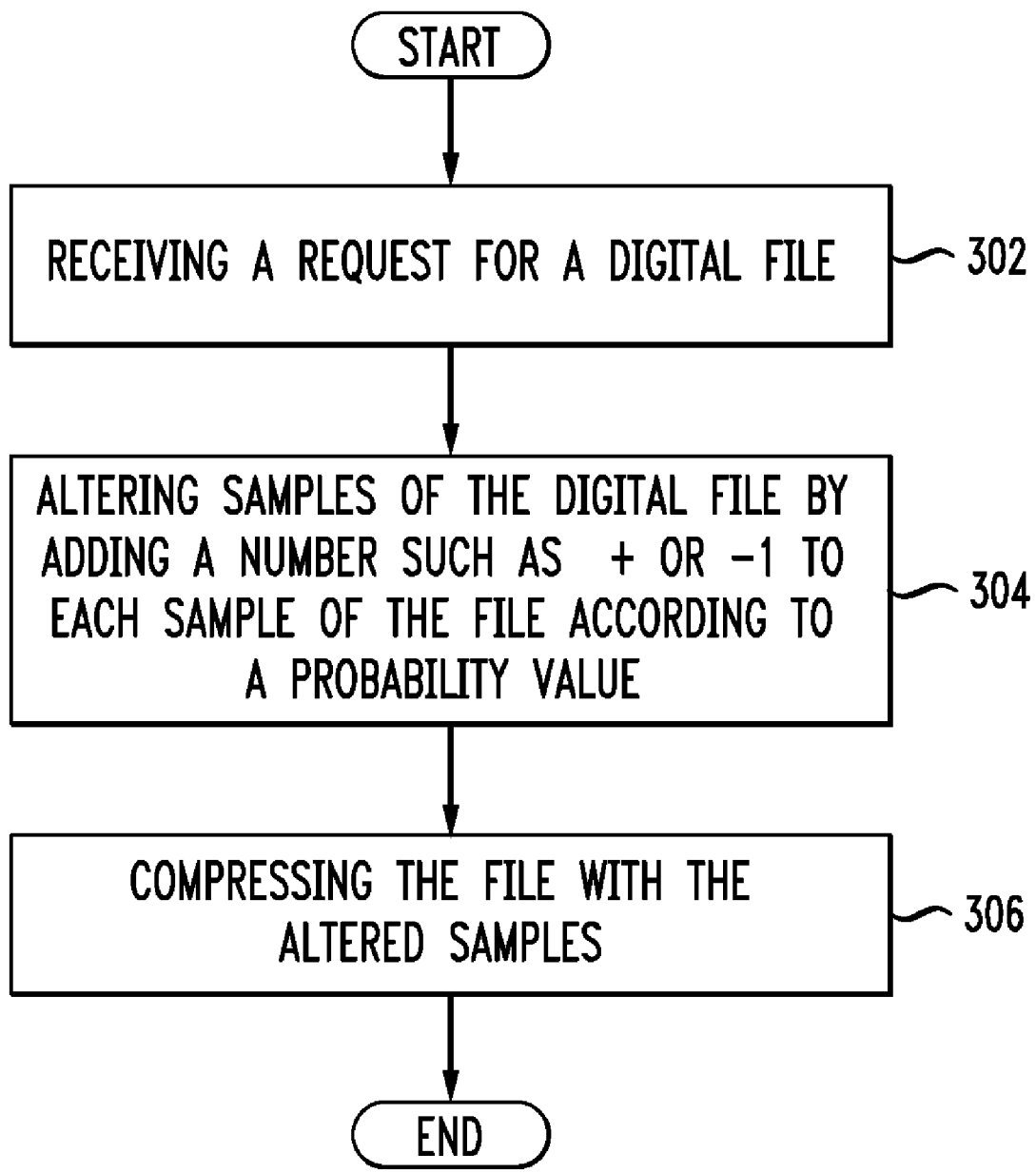

SYSTEM AND METHOD OF GENERATING A PER SALE WATERMARKING ON DIGITAL FILES

RELATED CASE

The present invention relates to U.S. Patent Application Ser. No. 11/647,510, incorporated herein by reference.

BACKGROUND OF THE INVENTION

1. Field of the Invention

The present invention relates to watermarking signals and more specifically to a presale watermarking of digital files prior to compression.

2. Introduction

Current music industry practice is to "sue first and ask questions later". For example, when attempting to prevent piracy or unauthorized copying of audio files, often any MP3 file is assumed to have illegal providence. In other words, the source of that particular MP3 file is assumed to be illegal rather than from the authorized owner or authorized distributor under copyright law. In any individual case, proving or disproving such assumption can be problematic. Digital rights management (DRM) schemes essentially sidestep this issue by trying to make illegal use technically impossible. There are problems with these approaches to protecting copyrighted information. For example, clumsy technologies that result from DRM schemes render an end user's experience in purchasing and downloading digital files such as MP3 music files so difficult that the market can be stifled. On the other hand, users have incentives to find DRM work-arounds which infringe on the copyright owner's rights. What is needed in the art is a mechanism by which copyrighted information can be tracked to the original purchaser while not restricting the use of the distributed digital file or its functionality in any way.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention relates to various embodiments for watermarking a digital signal. For example, such embodiments comprise a system embodiment, a method embodiment, a compressed digital file embodiment and a computer readable media embodiment. An example method embodiment comprises a method of watermarking a file, the file being made available for multiple downloads. The method comprising altering samples of a file available for distribution upon request by adding a number such as a + or a −1 to each sample of the file according to a probability value and compressing the file with the altered samples. This watermarking may be done on a per sale or per distribution basis.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
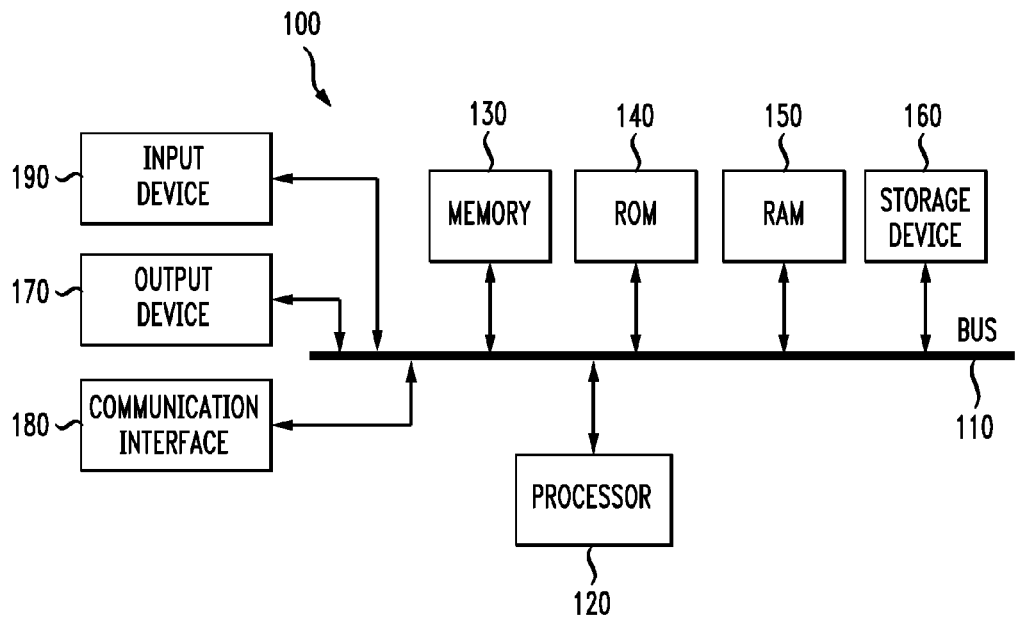
FIG. 1 illustrates a general system embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories RAMs), read only memory (ROM, a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

Figure 2:
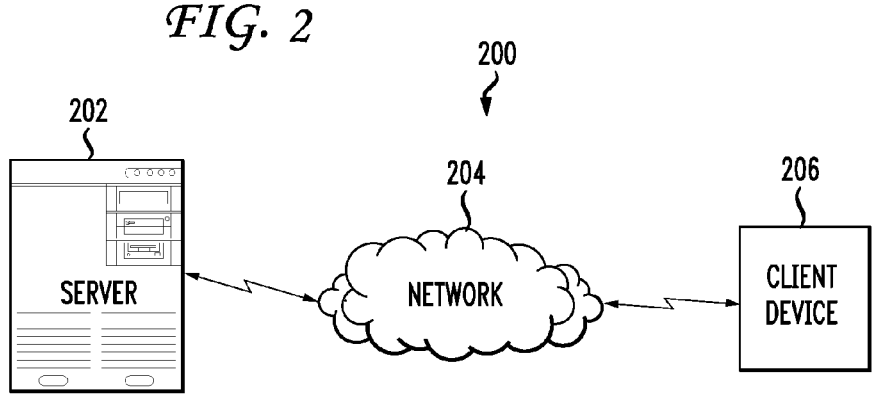
FIG. 2 illustrates the general distribution network utilized in connection with the invention.

FIG. 2 illustrates a generic distribution system 200 used in connection with the invention. Server 202 typically with store a digital file for distribution over network 204 to client devices 206. The network 204 represents any distribution network to be known or to be developed. For example, network 204 maybe the internet or may be any known wireless network or maybe a combination thereof. The context in which the present invention typically applies is where a file resides on server 202 which is available for distribution and download over the network to client devices for purchase. The problem outlined above is that using the existing clumsy digital rights management technologies it is difficult to balance the protections afforded to copyright owners of the digital file and the user experience. The present invention provides a mechanism for resolving this issue.

FIG. 3 illustrates a method embodiment of the invention. As shown in FIG. 3, an example method embodiment comprises receiving a request for a digital file (302), altering samples of the digital file by adding a number such as a + or −1 to each sample of the file according to a probability value (304) and compressing the file with the altered samples (306). It is preferable that each sample of the digital file is altered by adding the number to each sample prior to compression. The digital file is preferably available for distribution and the method does not need to include each of the steps above. For example, the step of receiving a request is not necessary where the digital file may be altered by adding the number and the file is simply available for capable of distribution in some manner. In one aspect, the watermarking may be done on a per sale or per distribution basis. The watermarking may also be done on a group basis or in some other manner to track single or groups of files distribution in some ordered fashion. Typically, after compression of the digital file with the altered samples the file is then distributed over any kind of network to a receiving device and such aspects of the distribution, such as billing, tracking, generating a receipt are also accomplished as is known in the art. "The number" may also refer to any symbol or letter which may be added to the file.

An aspect of the present invention is generating a receipt for the distribution of the file wherein the receipt includes or is associated with the altered digital file wherein various samples within the file are altered according to the method of the invention. It is also generally preferred that the file be an audio file but the principles of the present invention may apply to any file that is to be distributed, an audio file, a video file, a multimedia file or a text file and the like may utilize the principles of the present invention for their distribution.

It is also preferred that the probability value used in the present invention is small. For example, a probability value of 1 in 10,000 may be used. In this case, the various samples of the digital file are processed, each sample of the audio file has a 1 in 10,000 probability of having a + or −1 added to it. While it is preferable that a relatively small probability be utilized in the present invention any particular range of the probability value is not an essential requirement of the invention.

After adding the + or −1 and after compression, each instance of the compressed file will be different which enables traceability. For example, assume the compression is 128 kb for a MP3 file and the probability is 1 in 10,000 a sample in one channel left or right) then has a 1 in 20,000 chance of alteration. The random signal is bipolar, so if the sampling rate is 44.1 khz, the added signal will be centered around 1.1 hz. The added noise is thus below the threshold of perception in both power and frequency. The effect on the MP3 encoder however is striking. Two thirds of the encoded frames are different in the presence of the added noise signal.

The present invention provides each purchaser of a digital file, such as a music file, with a unique watermarked file. This method allows the legitimate owner and copyright owner of the file to produce a receipt for its purchase just as any other piece of merchandise. This protects the copyright owner, the seller and the purchaser. Advantageously, the file is unencumbered with digital rights management technology so the purchaser's fair use rights are not restricted. A malicious user may attempt to erase the watermark through a process such as transcoding, but this is known to degrade the quality of the file and produces an end result that if discovered is prima facie illegal since it will not match any of the files legitimately sold by the service provider.

By way of example is provided next a short program in the C programming language which will illustrate how the invention may be implemented:

```
#include <stdio.h>
#include <stdlib.h>
#include <sys/time.h>
#include <unistd.h>
static void slime(short*, int);
#define     HALF     (RAND_MAX/2)
char        randstate[256];
short       buf[4096];
double      slimefrac = 0.10;
int         slimerand;
int
main(int argc, char **argv)
{
    struct timeval t_now;
    int k, n, rc = 0;
    gettimeofday(&t_now, 0);
    initstate(t_now.tv_sec ^ t_now.tv_usec, randstate, sizeof randstate);
    setstate(randstate);
    if(argc > 1)
        slimefrac = strtod(argv[1], 0);
    slimerand = RAND_MAX * slimefrac;
    fprintf(stderr, "slimefrac = %f, slimerand = %d = 0x%x\n",
        slimefrac, slimerand, slimerand);
    for(;;) {
        n = read(0, buf, sizeof buf);
        if(n == 0)
            break;
        if(n < 0) {
            perror("read error");
            rc = 1;
            break;
        }
        if(n%2 == 0)
            slime(buf, n/2);
        k = write(1, buf, n);
        if(k < 0) {
            perror("write error");
            rc = 2;
            break;
        }
    }
```

```
-continued if(k != n) {
            fprintf(stderr, "short write %d/%d\n", k, n);
            rc = 3;
            break;
        }
    }
    exit(rc);
}
static void
slime(short *s, int n)
{
    int c;
    for(; n>0; --n, ++s) {
        if(random() > slimerand)
            continue;
        c = *s;
        if(random() <= HALF) {
            if(c != -32768)
                *s = c-1;
        }else{
            if(c != 32767)
                *s = c+1;
        }
    }
}
```

As stated above, providing this code is only by way of example and not to limit the scope of the claims. The general steps of the invention and modules disclosed herein for performing various functions may be implemented in any programming language on any type of computing device.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, while a +/−1 has been disclosed above, different numbers or symbols may be used. A +/−2, or +/−3, etc. may be used. The basic concept is that a value is attached to the signal as disclosed herein. Accordingly, the appended claims and their legal equivalents should only define the invention, rather than any specific examples given

I claim:

1. A computer-implemented method of watermarking a digital file, the file being made available for multiple downloads, the method causing a processor to perform the following steps:
    altering by a processor samples of a digital file available for distribution by adding one of +X or −X to each sample of the digital file according to a probability value to yield altered samples, wherein X is an integer or a letter and the samples are generated based on an analog to digital sampling rate; and
    compressing by the processor the digital file with the altered samples, such that a playback difference between the digital file and a reference digital file based on unaltered samples is below a perception threshold, and wherein that the altered samples comprise a unique watermark associated with a purchaser of the digital file.

2. The computer-implemented method of claim 1, wherein the samples are altered prior to compression.

3. The computer-implemented method of claim 1, further comprising:
    distributing the file to a user following compression and after a request from the user for the file.

4. The computer-implemented method of claim 1, further comprising:
    generating a receipt for the distribution of the file using the altered samples.

5. The computer-implemented method of claim 1, wherein the file is an audio file.

6. The computer-implemented method of claim 1, wherein the +X or −X is +1 or −1.

7. The computer-implemented method of claim 6, wherein altering the sample of the digital file is done on a per distribution or per sale basis.

8. A system for watermarking a digital file, the digital file being made available for multiple downloads, the system comprising:
    a processor;
    a first module configured to control the processor to alter samples of a digital file for distribution upon request by adding one of +X or −X to each sample of the digital file according to a probability value to yield altered samples, wherein X is an integer or a letter and the samples are generated based on an analog to digital sampling rate; and a second module configured to control the processor to compress a digital file with the altered samples, such that a playback difference between the digital file and a reference digital file based on unaltered samples is below a perception threshold, and wherein that the altered samples comprise a unique watermark associated with a purchaser of the digital file.

9. The system of claim 8, wherein the samples are altered prior to compression.

10. The system of claim 8, further comprising:
a third module configured to control the processor to distribute the file to a user following compression.

11. The system of claim 8, further comprising:
a third module configured to control the processor to generate a receipt for the distribution of the digital file using the altered sample.

12. The system of claim 8, wherein the file is an audio file.

13. The system of claim 8, wherein the +X or −X is a +1 or −1.

14. The system of claim 13, wherein the first module configured to control the processor to alter the sample of the digital file does so on a per distribution or per sale basis.

15. A computer-readable storage device storing a file containing a watermark, the file being made available for multiple downloads, the file being generated according encoded computer executable instructions in the computer-readable storage device which when executed by a computer cause the computer to perform steps of:

altering samples of a digital file available for distribution upon request by adding one of +X or −X to each sample of the digital file according to a probability value to yield altered samples, wherein X is an integer or a letter and the samples are generated based on an analog to digital sampling rate; and compressing the digital file with the altered samples, such that a playback difference between the digital file and a reference digital file based on unaltered samples is below a perception threshold, and wherein that the altered samples comprise a unique watermark associated with a purchaser of the digital file.

16. The computer-readable storage device of claim 15, wherein the samples are altered prior to compression.

17. The computer-readable storage device of claim 15, wherein a receipt is generated for the distribution of the file using the altered samples.

18. The computer-readable storage device of claim 15, wherein the file is an audio file.

19. The computer-readable storage device of claim 15, wherein the +X or −X is a +1 or −1.

20. The computer-readable storage device of claim 19, wherein altering the sample of the digital file is done on a per distribution or per sale basis.

* * * * *